Aug. 31, 1937.  F. J. LAPOINTE  2,091,736
SURFACE BROACHING MACHINE
Filed Nov. 18, 1935  4 Sheets-Sheet 3

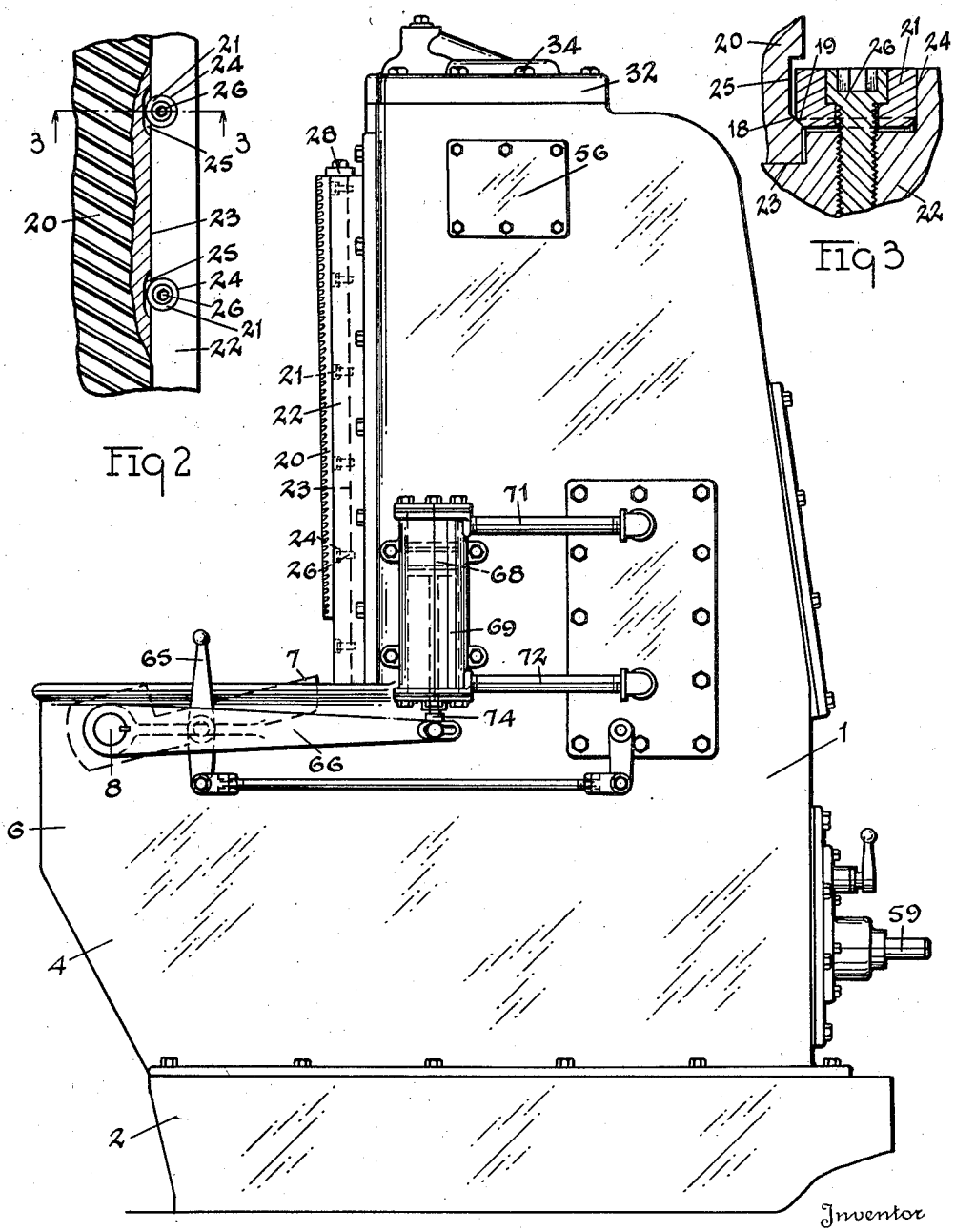

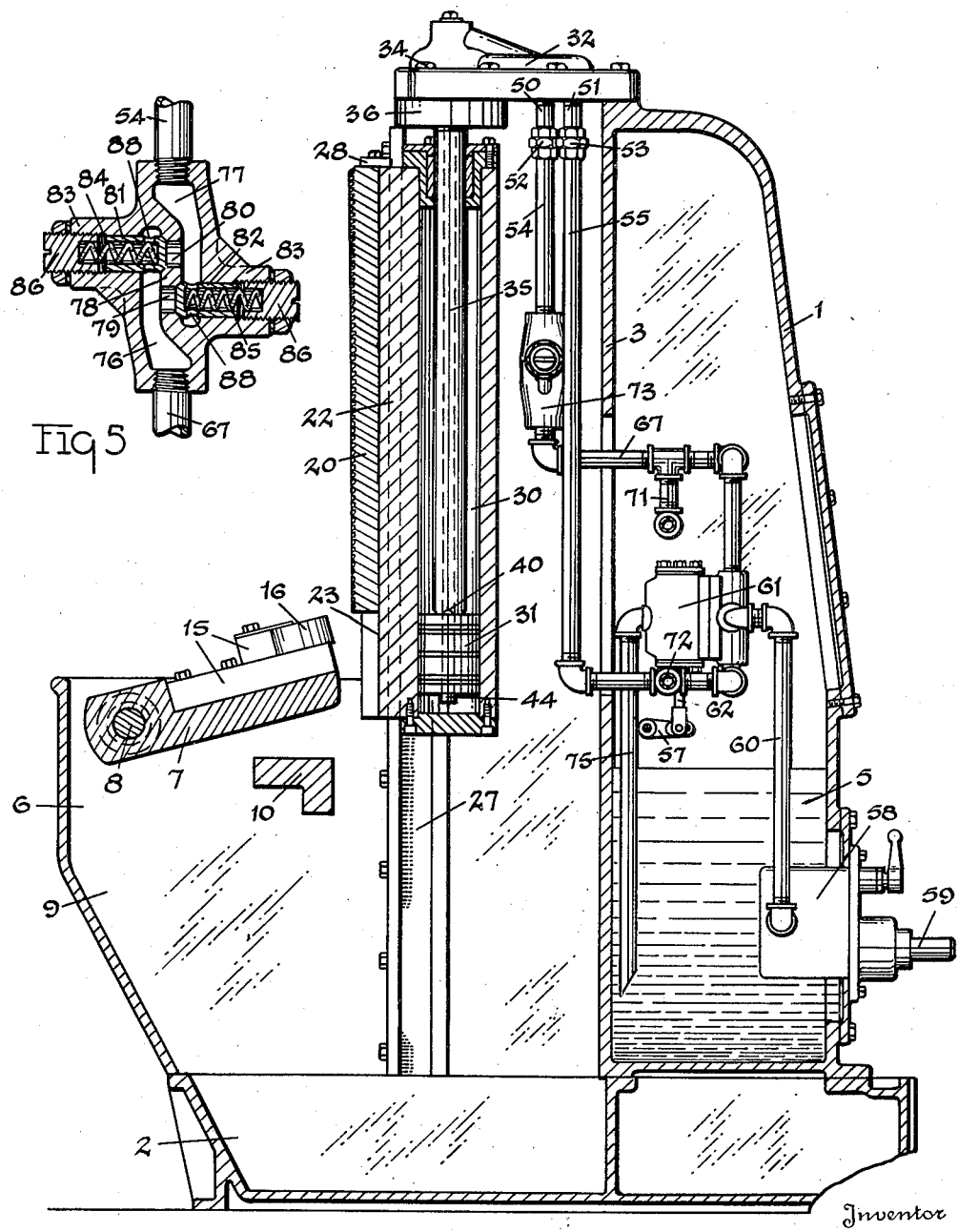

Inventor
Francis J. Lapointe
By
Attorney

Aug. 31, 1937.  F. J. LAPOINTE  2,091,736
SURFACE BROACHING MACHINE
Filed Nov. 18, 1935  4 Sheets-Sheet 4

Inventor
Francis J. Lapointe
By Faust G. Crampton
Attorney

Patented Aug. 31, 1937

2,091,736

UNITED STATES PATENT OFFICE 2,091,736

SURFACE BROACHING MACHINE

Francis J. Lapointe, Ann Arbor, Mich.

Application November 18, 1935, Serial No. 50,256

7 Claims. (Cl. 90—33)

My invention has for its object to provide a broaching machine that may be rapidly operated to efficiently surface broach articles or parts thereof. The invention particularly provides means for locating each article with respect to the broach in advance of the engagement of the article by the broach and to dispose the article in position for ready removal of the article upon completion of the broaching operation.

The invention also provides a fluid pressure controlled valve for producing sequential operations of the article moving means and the broach moving means in both direct and reverse movements of the said means.

The invention also provides a structural arrangement of piston and cylinder whereby the piston and the cylinder assembly may be readily removed from the broaching machine.

The invention also provides means whereby the broach may be readily secured to a movable cylinder guide plate.

The invention consists in other features that will appear from the following description and upon examination of the drawings. To illustrate a practical application of the invention, I have selected a surface broaching machine as an example of structures that contain the invention and shall describe the selected structure hereinafter. The particular structure selected is shown in the accompanying drawings.

Figure 6:
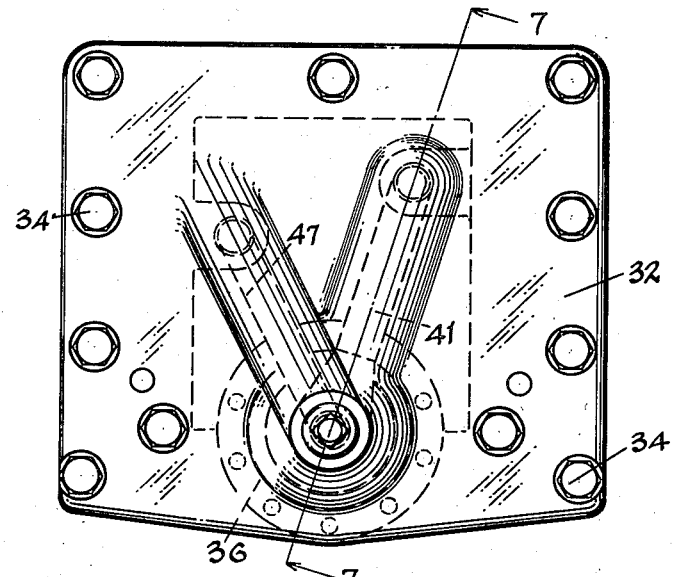
Figure 7:
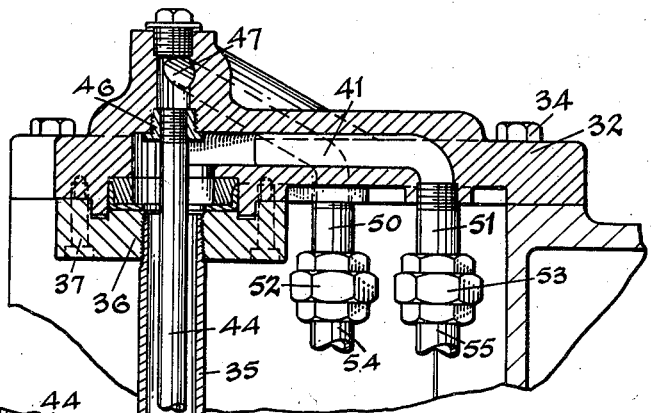
Figure 8:
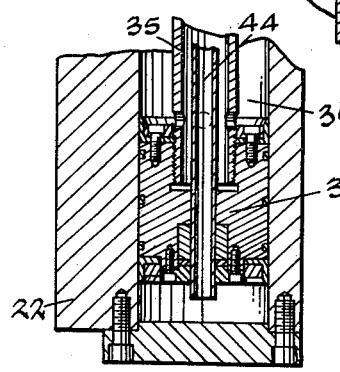
Figure 9:
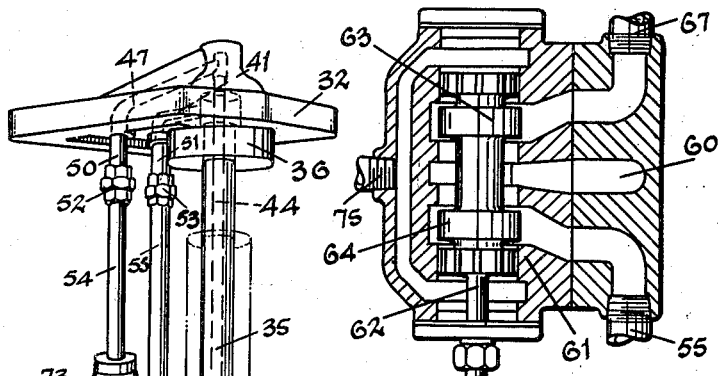
Figure 11:
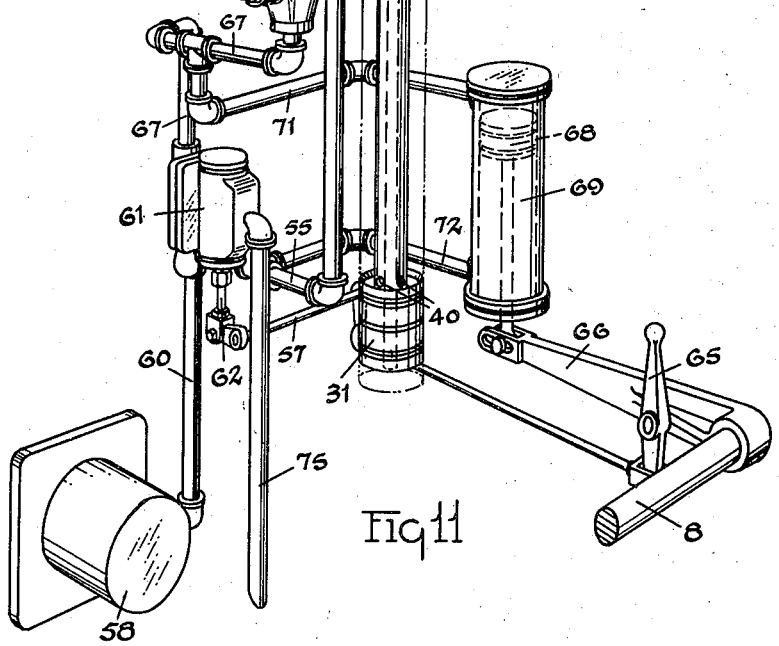
Figure 10:
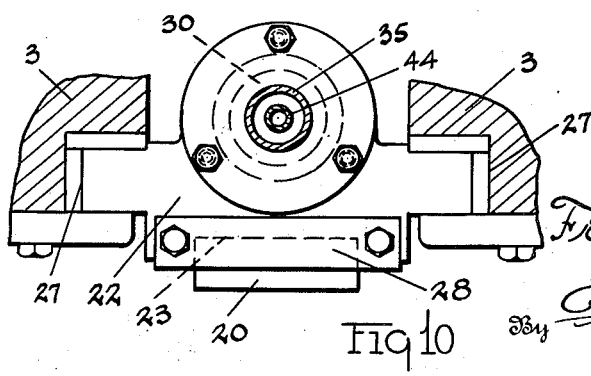

Fig. 1 illustrates a side view of the surface broaching machine selected as an example of the structures that contain my invention. Fig. 2 illustrates a broken view of a part of the broach and cylinder guide plate. Fig. 3 illustrates the means for securing the broach in the guide plate. Fig. 4 illustrates a view of a section of the broaching machine. Fig. 5 illustrates a view of a section of a pressure controlled valve. Fig. 6 illustrates a top view of the piston supporting head of the machine. Fig. 7 illustrates a view of a section taken on the plane of the line 7—7 indicated in Fig. 6. Fig. 8 is a view of a section of the piston. Fig. 9 illustrates a section of a controlling valve. Fig. 10 illustrates a top view of the broach supporting plate. Fig. 11 illustrates diagrammatically the fluid connection of parts of the machine and the means for conducting the fluid through which pressures are transmitted.

In the form of particular structure illustrated in the drawings, the machine 1 is supported on a base 2. The machine is provided with a suitable frame 3. It has a suitable reservoir 5 for oil that is used in the machine as a medium for the transmission of pressures. The machine is also provided with a table part or projecting ledge 6 in which is located a swinging work plate 7 keyed or otherwise secured to a shaft 8. The shaft is rotatably supported in suitable bearings formed in the side walls 9 of the ledge 6. The work preferably is secured to the plate so as to overhang the end of the work plate. A cross-bar 10 extends across the interior of the ledge 6 and is engaged by the work plate 7. It limits the movement of the plate in one direction and constitutes a support for the end of the plate on which the work is located. The plate 7 is provided with a suitable fixture 15 for securing the work 16 in position on the plate 7 so as to locate the part of the work which is to be surface broached in position to be engaged and broach-cut.

The broach 20 is in the form of a plate having an oblong rectangular cutting face that is provided with broach cutting teeth having parallel cutting edges extending across the face of the broach. The cutting edges are preferably inclined to the direction in which the broach is moved to produce progressive shearing of the metal by each tooth. Also the cutting edges of the teeth are located in a plane inclined to the direction of movement of the broach to produce progressive removal of surface portions of the parts of the article. The cutting operation of the broaching machine is performed during the downward movement of the broach, in the particular structure shown, and consequently, the edges of the upper teeth are located slightly more remote from a line located at the rear of the broach and parallel to the direction of movement of the broach than the cutting edges of the lower teeth of the broach are located from the said line.

The broach is mounted on a relatively heavy supporting plate 22. The supporting plate 22 is provided with laterally projecting flanges or guides located in the ways 27 formed in the frame 3 of the machine. The supporting plate 22 has a central broad channel 23, and the rear part of the broach 20 is located so as to position the lower teeth of the broach but slightly beyond the edges of the channel. The lateral side surfaces of the broach 20 are provided with either a plurality of short channels 25 or a single channel extending substantially the length of the said side surfaces. The lower sides 18 of the channels 25 are beveled to slope outwardly and rearwardly. The supporting plate 22 is bored to form the bores 24 at spaced points in advance of forming the central channel 23, so that when the central channel 23 is formed, the bores are cut through to form slots whose edges extend at right angles to the face of the supporting plate 22. Annular keys 21 that fit the bores 24 are inserted in the channels 25 formed in the lateral sides of the broach 20 and the bores, and the broach is then set into or placed against the bottom of the channel 23, the keys being moved into the bores as the broach 20 is placed in position on the supporting plate. Suitable stud-bolts 26 may be inserted through the ends of the annular keys and screwed into the face plate that is suitably bored and tapped to receive the bolts 26 to secure the annular keys therein and thus secure the broach in the channel 23. When the broach is located in position, the inner side of each channel 25 is located outwardly with respect to the bottom of the bores 24 with which the channel 25 is associated to form a space between the inner ends of the keys and the bottoms of the bores and to insure clamping of the broach into position by the bolts 26 when they are inserted in position in the keys and rotated until their heads engage the inner ends of the keys. The lower edges 19 of the keys are also beveled and when forced against the surfaces 18 of the slots 25 they press the broach laterally as well as rearwardly. Thus, if the broach is narrower than the width of the channel 23, the broach may be centered with respect to the center line of the channel and clamped against the bottom of the channel, or the broach may be clamped not only against the bottom of the channel 23, but also against one of the side surfaces of the channel 23 by the keys located on the other side of the channel.

If the lateral sides of the broach 20 are provided with channels extending the length of the sides of the broach, the keys 21 may be inserted in the holes 24 and loosely held by the bolts 26, and the broach may be located in the channel 23 by the lengthwise movement of the broach with respect to the broach and to the supporting plate 22, the side channels of the broach moving along the rows of keys on opposite sides of the channel 23. The broach may then be secured against the bottom of the channel 23 by the bolts 26.

The broach is further secured to the plate 22 by means of the cross-bar 28, which is bolted to the upper ends of the supporting plate 22, so as to locate the bar 28 across the upper end of the channel 23, and the upper end of the broach 20 to securely sustain the load of the working stroke of the broach as it broach-cuts the work.

The supporting plate 22 is provided with a centrally enlarged portion in which is formed the cylinder 30. A piston 31 is located in the cylinder 30. The piston is provided with suitable rings and cup washers for preventing the escape of oil past the piston from either end of the cylinder. The piston 31 is suspended from the head 32 of the machine, which is suported on the upper end of the frame 3 and bolted thereto by suitable bolts 34. The piston 31 is connected to the lower end of a pipe 35. The upper end of the pipe is connected to a block 36. The block 36 is secured to the head 32 by the bolts 37. The pipe 35 is provided with openings 40 located in proximity to the upper surface of the piston. The upper end of the pipe 35 communicates with a passageway 41 formed in the head 32 of the machine from which oil may be directed through the pipe 35 and the openings 40 to the portion of the cylinder 30 located above the piston 31.

The pipe 35 is relatively large in diameter, and a second pipe 44 is located within the pipe 35 and extends through the passageway 41 and the piston 31. It terminates at the lower face or end of the piston 31, and its open end communicates with that portion of the cylinder 30 located below the piston 31. The pipe 44 is suspended from the head 32, it being connected to the head by a threaded bushing 46. The pipe 44 communicates with a passageway 47 formed in the head 32 through which oil may be conducted to the pipe 44 and through the pipe 44 to that portion of the cylinder located below the piston 31.

The passageways 41 and 47 of the head are located in planes that extend radially with respect to the axis of the substantially coaxially arranged pipes 44 and 35, so as to locate the said planes of the axes of the passageways 41 and 47 and the common axis of the pipes 35 and 44 symmetrical with respect to the vertical, central, longitudinally extending plane of the machine as appears in Fig. 6 of the drawings. The outer rear ends of the passageways 41 and 47 within the head 32 turn downward and are tapped to receive the ends of the connector pipes 50 and 51. The connector pipes 50 and 51 are connected with the pipes 54 and 55 by means of the unions 52 and 53. The pipes 54 and 55 are connected to a source of supply of oil under pressure through suitable valves for directing the fluid as may be required, to produce pressure in one or the other of the end portions of the cylinder and to exhaust the end portion of the cylinder other than the one that is connected to the source of supply of oil under pressure. Preferably a removable door or cover plate 56 is disposed in side walls to enable convenient connections and disconnections of the pipes by means of the unions 52 and 53.

By means of the assembly of the cylinder and piston and the connections of the piston to the head of the machine as described above, the piston and cylinder and their connected parts may be readily removed merely by removing the bolts 34 and disconnecting the unions 52 and 53, whereby the piston 31 and the cylinder structure may be readily installed, or removed for repair, or replaced by another cylinder and piston structure having the same or larger or smaller diameters according to the work to be performed by the machine.

The broach is operated by the pressure produced by the pump 58, which may be driven by a suitable shaft 59. The shaft 59 may be operated by a motor means of any well-known form. The pump 58 draws oil from the reservoir 5 and moves it under pressure through the pipe 60 to the valve 61. The valve is of a form well known in the art. (Fig. 9.) It is provided with a suitable movable valve member 62 having piston members 63 and 64 for closing and opening passageways in the valve casing to direct oil, through chambers and passageways formed in the valve, to pipes that lead to or from portions of the interior of the cylinder located above and below the piston 31 according to the position in which the movable valve member is located.

The movable valve member 62 of the valve 61 is connected to a bell crank lever 57. The bell crank lever 57 is suitably mounted in the frame of the machine and is operated by means of a lever 65 conveniently disposed in the locality of the work plate 7 where it may be readily operated by the operator of the machine. In advance of the manipulation of the lever 65 to produce the working stroke of the broach member, the operator places an article to be broached upon the plate 7 and secures it in position in or on the fixture 15 secured to the plate 7. The broach is then at the upper end of the machine, and the plate 7 is inclined upwardly and is thus located in position to enable ready and accurate placement of the work with reference to the plate and with reference to the broach when the plate and the work are lowered to work cutting position.

The shaft 8 on which the plate 7 is mounted is provided with an arm 66 that is connected to a piston 68 located in a cylinder 69. The upper end of the cylinder 69 is connected to the valve 61 by means of the pipes 67 and 71, and the lower end of the piston 69 is connected to the valve 61 by means of the pipe 72. A two-way resistance valve 73 is located intermediate the pipes 67 and 54 to raise the pressure in one of the pipes 71 or 72, depending on the location of the movable valve member 62 in the valve casing, in advance of raising or lowering the pressure in the pipe 54 above or below predetermined amounts. Thus, when the handle of the lever 65 is drawn toward the operator, the movable valve member 62 is lowered which directs the pressure through the pipes 67 and 71 to lower the piston 68 in advance of the movement of the broach. When the plate 7 engages the cross-bar 10, the pressure in the pipes 67 and 71 is raised by reason of the resistance to the further movement of the piston, so as to force the oil through the resistance valve 73, and the pressure is transmitted through the pipe 54 to that portion of the cylinder located beneath the piston 31 which causes the cylinder to descend and the broach to perform its working stroke.

Upon the completion of the working stroke, the handle of the lever 65 is moved in a direction away from the operator, and the plate 7 is raised by the piston 68. The lever 65 moves the valve member 62 of the valve 61 to the extreme opposite position to produce pressure of the oil in the pipes 55 and 72. The pressure of the oil in the pipe 55 is transmitted to the portion of the cylinder above the piston which tends to raise the cylinder and force the oil from the lower end portion of the cylinder below the piston 31 through the pipe 54. The return movement of the oil is through the pipe 54 and the valve 73. The valve 73, together with the weight of the cylinder 30 and the plate 22, resists the transmission of the oil from the lower end of the cylinder until the pressure produced in the pipes 55 and 72 rises to a point such as to cause the pressure in the cylinder 69 to raise the piston 68, which raises the plate 7 from the cross-bar 10 and locates the work 16 in position where it may be readily removed by the operator. The upward movement of the plate 7 is limited by a suitable stop 74 that may be located on the piston rod of the piston 68. The pressure in the pipes 72 and 55 continues to rise until the pressure transmitted through the oil in the pipe 55 moves the cylinder 30 and forces the return flow of the oil through the valve 73 whence it is directed by the valve 61 to the reservoir 5 through the pipe 75.

The valve 73 is provided with a pair of chambers 76 and 77 separated by a wall 78. (Fig. 5). The wall 78 is provided with a pair of openings 79 and 80, and a valve seat is formed at one end of each opening in the wall 78, one on the side of the wall on which the chamber 76 is located, and the other on the side of the wall 78 on which the chamber 77 is located. Movable valve members 81 and 82 are located in bored and tapped bosses 83 formed on the valve casing and in registering relation with the valve seats. The valve members 81 and 82 are formed hollow and are spring pressed by means of the springs 84 and 85 that are located within the valve members and bored plugs 86 located in the bosses. The springs operate to press the valve members with a predetermined pressure against their seats. The plugs 86 are threaded and may be rotated to adjust the pressure of the springs 84 and 85. The movable valve members 81 and 82 are provided with openings 88 which admit oil into the movable valve members and thus transmit pressure of the oil in the chamber in which each valve member is located to the inner end of the hollow valve member which coacts with its associated spring to hold the movable valve member seated as against the pressure of the oil in the other of the chambers. Thus, when oil under pressure is transmitted to the chamber 76 of the valve 73 in advance of producing the working stroke of the broach, movement of the movable valve member 82 is resisted by the spring 85 until the pressure is raised in the pipe 71 to cause the operation of the piston 68 and movement of the plate 7 to locate the work in broach engaging position. When the pressure in the pipe 71 reaches a sufficient pressure to overcome the pressure of the spring 85 and the pressure in the chamber 77, oil will move through its associated opening 79, the pipe 54, and the pipe 44 into the lower end of the cylinder 30 and cause the broach to perform its working stroke. Upon completion of the working stroke, the operator moves the handle of the lever 65 rearwardly which produces pressure in the pipes 55 and 72. The pressure in the pipe 55 tends to raise the piston 31, but by reason of the load or weight of the broach 20 and its supporting plate 22, and also by reason of the resistance of the spring 84 to the return of the oil from the lower end of the cylinder through the valve 73, the pressure in the lower end of the cylinder 69 is raised, and consequently the plate 7 is raised in advance of a material upward movement of the broach 20. The pressure in the pipe 55 continues to rise until it overcomes the resistance to the flow of the oil from the lower end of the cylinder 30 exerted by the spring 84, and the oil then flows through the chamber 77 and into the chamber 76 and to the valve 61 whence it is conducted by the pipe 75 to the reservoir 5.

The effective counter pressure of the spring 85 is necessarily greater than the effective counter pressure of the spring 84, in order that a balanced or similar effective pressure in the cylinder 69 may be produced to cause substantially like direct and reverse movements of the plate 7 and to hold the cylinder 30 in the upper position, while the movable valve member is in the neutral position that shorts the oil circuits of the machine from the pump to the reservoir. When the oil is trapped by the valve 82, the weight of the cylinder counteracts partially the pressure of the spring 85.

Thus, in advance of each movement of the broach, the work supporting plate 7 is automatically operated either to dispose the work in position to be broach cut in advance of the working stroke of the broach, or in position for ready replacement of the work in advance of the return movement of the broach.

I claim:
1. In a broaching machine, an oscillatable work plate movable to and from work loading and broach cutting positions, a member for limiting the movement of the work plate when in broach cutting position, means for securing the work to the work plate, a cylinder and piston for oscillating the work plate, a broach for engaging the work when the work plate is in broach cutting position, a cylinder and piston for reciprocating the broach, a source of supply of fluid under pressure, and a resistance valve for resisting the flow of the fluid to and from the broach reciprocating cylinder to produce sequential initial operating pressures in the cylinders.

2. In a broaching machine, a work plate, a shaft pivotally supporting one end of the work plate, a plate supporting cross-bar for supporting the other end of the work plate, means for securing the work to the work plate, a cylinder and piston for operating the shaft to oscillate the work plate, a broach, a reciprocally mounted plate for supporting the broach, a cylinder and piston for reciprocating the broach supporting plate in a plane parallel to the shaft, a source of supply of fluid under pressure, and a resistance valve for resisting the flow of the fluid to and from the broach operating cylinder to produce operating pressures in the work plate operating cylinder in advance of production of operating pressures in the broach operating cylinder.

3. In a broaching machine, an oscillatable work plate, means for securing the work to the work plate, a cylinder and piston for oscillating the work plate, a broach, a cylinder and piston for reciprocating the broach, a source of supply of fluid under pressure, a part having a passageway for directing fluid to one end of the broach operating cylinder for moving the broach in one direction and for exhausting the fluid from the said end of the cylinder to permit movement of the broach in the other direction, a valve located in the circuit of the fluid through the said part and having movable valve members, and means for yieldingly resisting the movement of the movable valve members for resisting the flow of the fluid, one valve member operating to resist the flow of the fluid to the broach operating cylinder and the other valve member for yieldingly resisting the flow of the fluid from the broach operating cylinder to produce alternate broach and work plate operations.

4. In a broaching machine, a broach, a reciprocable broach supporting plate having laterally extending guide flanges, guideways in which the flanges are located for guiding the plate, means for securing the broach to the face of the broach plate, the broach plate having a cylinder formed in and extending substantially the length of the plate, cylinder heads secured to the ends of the plate, a machine head having passageways located in planes extending radially from the axes of the cylinder, a piston located in the cylinder, a pipe connected to the machine head and the piston and communicating with the end of one of the passageways in the machine head at the axis of the cylinder and with the portion of the cylinder on one side of the piston, a second pipe connected to the machine head and extending to the piston and communicating with the end of the other of the passageways in the machine head at the axis of the cylinder and a portion of the cylinder on the other side of the piston, pipes connected to the remaining ends of the passageways of the machine head for conducting fluid to and from the cylinder, unions for disconnecting the pipes with the machine head whereby the machine head, the broach plate, the cylinder, and the piston may be removed as a unit upon disconnection of the machine head.

5. In a broaching machine, a reciprocable broach supporting plate, guideways for guiding the plate, a broach connected to the plate, the plate having a cylinder formed therein, a machine head having passageways located in planes extending radially from the axis of the cylinder, a piston located in the cylinder, a pipe connected to the machine head and to the piston and communicating with the end of one of the passageways in the machine head at the axis of the cylinder and with the portion of the cylinder on one side of the piston, a second pipe connected to the machine head and extending to the piston and communicating with the end of the other passageways in the machine head at the axis of the cylinder and the portion of the cylinder on the other side of the piston whereby the machine head, the broach plate, the cylinder, and the piston may be installed and removed as a unit.

6. In a broaching machine, a frame, a reciprocable broach supporting plate, guideways for guiding the plate, a broach connected to the plate, the plate having a cylinder formed therein, a machine head removably connected to the frame and having passageways, a piston located in the cylinder, a pipe connected to the machine head and to the piston and communicating with one of the passageways in the machine head and with the portion of the cylinder on one side of the piston, and a second pipe connected to the machine head and extending to the piston and communicating with the other passageway in the machine head and the portion of the cylinder on the other side of the piston whereby the machine head, the broach plate, the cylinder, and the piston may be installed and removed as a unit.

7. In a metal shaping machine, a movable work supporting member, a cylinder and piston for moving the work supporting member, a metal shaping member, a cylinder and piston for moving the metal shaping member, a source of supply of fluid under pressure, means for connecting the said source with the said cylinders, a valve located in the circuit of the fluid and having movable valve members, and means for yieldingly resisting the movement of each of the valve members for resisting the flow of the fluid past the said valve member, one valve member operating to resist the flow of the fluid to one cylinder, and the other valve member for yieldingly resisting the flow of the fluid from the said one cylinder to produce alternate movements of the work supporting member and the metal shaping member.

FRANCIS J. LAPOINTE.